United States Patent [19]

Park et al.

[11] 3,851,240

[45] Nov. 26, 1974

[54] RECTIFIER CIRCUITS USING AT LEAST ONE MULTI-WINDING TRANSFORMER IN COMBINATION WITH TRANSISTORS CONNECTED IN AN INVERTER MODE AND ARRANGED IN A BRIDGE CONFIGURATION

[75] Inventors: John N. Park, Rexford; Robert L. Steigerwald, Scotia; Loren H. Walker, Schenectady, all of N.Y.

[73] Assignee: General Electric Company, Schenectady, N.Y.

[22] Filed: Nov. 15, 1973

[21] Appl. No.: 416,116

[52] U.S. Cl. .................................... 321/45, 321/47

[51] Int. Cl. ............................................ H02m 7/20

[58] Field of Search ................................ 321/45, 47

[56] References Cited

UNITED STATES PATENTS

| | | | |
|---|---|---|---|
| 3,308,372 | 3/1967 | Young et al. | 321/45 R |
| 3,735,235 | 5/1973 | Hamilton et al. | 321/47 X |

FOREIGN PATENTS OR APPLICATIONS

| | | | |
|---|---|---|---|
| 851,375 | 10/1960 | Great Britain | 321/47 |

OTHER PUBLICATIONS

IBM Journal, "A Symmetrical-Transistor Steering Circuit," J. L. Walsh, April 1957, pp. 185–188.

*Primary Examiner*—R. N. Envall, Jr.
*Attorney, Agent, or Firm*—Jerome C. Squillaro; Joseph T. Cohen

[57] ABSTRACT

Full-wave rectifier circuits are disclosed wherein four transistors are connected in a bridge configuration. At least one multi-winding transformer is employed in combination with the four transistors for controlling the base currents of the transistors. Each transistor is connected in an inverted mode so that voltage blocking is performed by its collector-base junction. High efficiency is achieved by controlling the base current of each transistor in response to the emitter current thereof whereby the base current is proportional to the emitter current so as to minimize circuit losses.

25 Claims, 3 Drawing Figures

RECTIFIER CIRCUITS USING AT LEAST ONE MULTI-WINDING TRANSFORMER IN COMBINATION WITH TRANSISTORS CONNECTED IN AN INVERTER MODE AND ARRANGED IN A BRIDGE CONFIGURATION

CROSS-REFERENCES TO RELATED PATENT APPLICATIONS

A related copending U.S. patent application Ser. No. 406,162, filed Oct. 15, 1973, in behalf of the same inventors in whose behalf this patent application is filed, titled RECTIFIER CIRCUITS USING TRANSISTORS AS RECTIFYING ELEMENTS, discloses half-wave and full-wave rectifier circuits using one and two transistors, respectively, in inverted mode connections. Another related copending U.S. Pat. application, Ser. No. 412,342, filed Nov. 2, 1973, in behalf of the same inventors in whose behalf this patent application is filed, titled BRIDGE RECTIFIER CIRCUITS USING TRANSISTORS AS RECTIFYING ELEMENTS, discloses full-wave bridge rectifier circuits using four transistors in inverted mode connections. Another copending U.S. patent application Ser. No. 267,262, filed June 28, 1972, in behalf of Thomas E. Anderson and John P. Walden, titled POWER SUPPLY INCLUDING INVERTER HAVING MULTIPLE-WINDING TRANSFORMER AND CONTROL TRANSISTOR FOR CONTROLLING MAIN SWITCHING TRANSISTORS AND PROVIDING OVERCURRENT PROTECTION, discloses a high frequency inverter circuit capable of providing a single-phase, bipolar, rectangular (or square) waveform output voltage which may be employed as the input a.c. power source for the bridge rectifier circuits herein disclosed.

The entire right, title and interest in and to the inventions described in the aforesaid patent applications, as well as in and to the aforementioned patent applications, and the entire right, title and interest in and to the inventions hereinafter disclosed, as well as in and to the patent application of which this specification is a part, are assigned to the same assignee.

BACKGROUND OF THE INVENTION

The subject invention pertains, in general, to full-wave rectifier circuits employing active solid state rectifying elements connected in a bridge configuration; and, in particular, to full-wave rectifier circuits employing transistors which are connected in a bridge configuration and serve as the rectifying elements. The subject invention pertains, more particularly, to full-wave rectifier circuits employing transistors in an inverted mode connection in a bridge configuration together with at least one multi-winding transformer for controlling, inter alia, the base currents of the transistors.

The earlier-filed U.S. patent application Ser. No. 406,162, of the same inventors in whose behalf this patent application is filed, sets forth various desiderata respecting small, lightweight rectifier circuits suitable for operation at relatively low voltage, relatively high current and relatively high frequency; said earlier-filed patent application also sets forth various limitations respecting the use of passive rectifying elements such as silicon diodes, germanium diodes and Schottky (hot carrier) diodes. The same earlier-filed patent application also identifies one publication disclosing the use of a transistor as a rectifying element in a half-wave rectifier circuit; i.e., "New Techniques in Power Control" by J. B. Gunn, *Digest of Technical Papers*, 1970 IEEE International Solid State Circuit Conference, at pages 90 and 91.

SUMMARY OF THE INVENTION

One object of the invention is to provide a high efficiency, full-wave bridge rectifier circuit.

Another object of the invention is to provide a small volume, lightweight, full-wave bridge rectifier circuit.

Another object of the invention is to provide a rectifier circuit employing active solid state rectifying means in a full bridge configuration.

Another object of the invention is to provide a rectifier circuit employing transistors as rectifying elements in a full bridge configuration.

Another object of the invention is to provide a high efficiency, full-wave, bridge rectifier circuit operating at relatively high frequency, relatively low voltage and relatively high current.

Another object of the invention is to provide a full-wave bridge rectifier circuit employing transistors which may be fabricated as part of an integrated circuit assembly.

Another object of the invention is to provide a full-wave bridge rectifier circuit employing rectifying transistors in combination with at least one multi-winding transformer for controlling, inter alia, the base currents of the transistors.

One feature of the full-wave bridge rectifier circuit according to the invention is the employment of four transistors arranged in a full bridge configuration wherein each transistor is connected in an inverted mode so that voltage blocking is performed by its collector-base junction. One advantage of the aforementioned inverted mode transistor connection is that available silicon transistors may be used despite their having a relatively low value of $BV_{EBO}$ since the voltage blocking function is performed by the collector-base junction of the transistor. Another advantage is that conventional transistor designs having low $R_{sat}$ exhibit very low $V_{CE}$ (SAT) for inverted conduction.

Another feature of the invention relates to the employment of at least one multi-winding control transformer having at least one primary winding as well as at least four secondary windings; each transistor having one of the secondary windings associated therewith for the purpose of controlling the base current of the transistor in response to its emitter current. The base current is controlled so that it is maintained at a near optimum magnitude; i.e., a magnitude not in excess of that required so that circuit losses are kept at a minimum.

Another feature of the invention is exemplified in one embodiment of the invention wherein one multi-winding control transformer is comprised of a single magnetic core member having five windings magnetically coupled therewith. One winding serves as a primary winding while the other four windings serve as secondary windings, each transistor having one secondary winding associated therewith for the purpose of controlling the base current of the transistor in response to its emitter current. The base current is controlled so that it is maintained at a near optimum magnitude; i.e., a magnitude not in excess of that required so that circuit losses are kept at a minimum. One advantage of using a single magnetic core member for the one primary winding and the four secondary windings is that the overall size of the multi-winding control transformer is minimized due, partly, to the sharing of the magnetic core material and due, mainly, to the cancellation of the d.c. components of magnetic flux resulting from currents associated with two of the four transistors operating in combination with the one primary winding and two of the secondary windings of the multi-winding control transformer.

Another feature of the invention is exemplified in other illustrative embodiments of the invention wherein two three-winding control transformers are employed. Each three-winding control transformer is comprised of a single magnetic core member having three windings magnetically coupled therewith. One winding serves as a primary winding while the other two windings serve as secondary windings. Each of the transistors in the bridge circuit configuration has one secondary winding associated therewith for the purpose of controlling the base current of the transistor in response to its emitter current. The base current is controlled so that it is maintained at a near optimum magnitude; i.e., a magnitude not in excess of that required so that circuit losses are kept at a minimum. One advantage of using a single magnetic core member for three windings is that the overall size of each control transformer is minimized due, partly, to the sharing of the magnetic core material and due, mainly, to cancellation of the d.c. components of magnetic flux resulting from currents associated with two of the four transistors operating in combination with two of the magnetically coupled secondary windings and one of the primary windings which is also magnetically coupled with said two secondary windings.

Another feature of the full-wave bridge rectifier circuit according to the invention relates to the employment of four diodes in combination with the four transistors in the bridge configuration; each transistor having one of the diodes associated therewith. Each diode is connected between the emitter and collector of the transistor with which it is associated. One advantage of using diodes in combination with transistors in the bridge configuration is that each diode provides a path for the initial rectified current at turn-on of the transistor with which it is associated. An additional advantage is that the aforesaid initial rectified current forces the initiation of regenerative action by associated magnetically coupled windings thereby improving switching efficiency of the transistor with which the diode and windings is associated.

Another feature of the invention is exemplified in one illustrative embodiment of the invention wherein resistance elements are employed in combination with the transistors and associated secondary windings for the purpose of enabling base current equalization between the transistors which are conducting; each resistance element being serially connected between a different one of the secondary windings and the base of an associated transistor.

Other objects, as well as other features and advantages of the invention appear hereinafter wherein three exemplary embodiments of the invention are disclosed for the purpose of illustrating the invention; said disclosures including the accompanying drawing figures, the content of which is hereinafter described.

DRAWINGS

DETAILED DESCRIPTION

Figure 1:
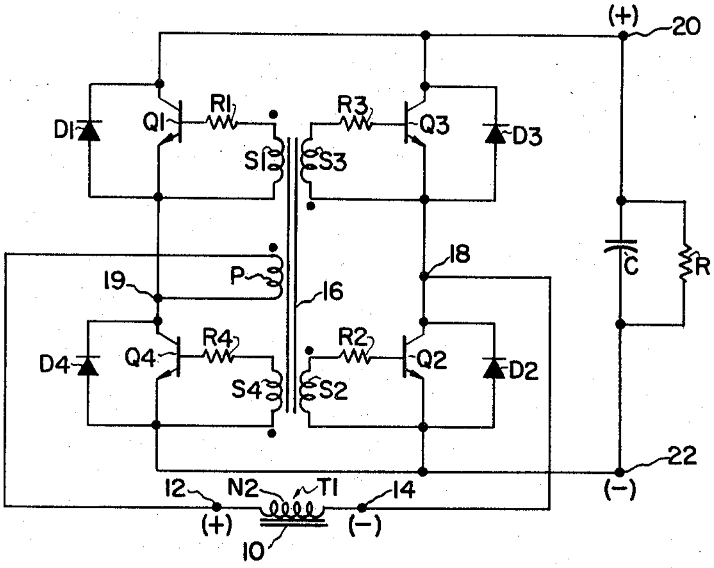
FIG. 1 is a schematic diagram of a full-wave bridge rectifier in accordance with one exemplary embodiment of the invention.

The full-wave bridge rectifier circuit shown at FIG. 1 employs a power transformer designated, generally, by the reference T1. Transformer T1 includes a magnetic core member 10 which has a secondary winding N2 wound thereabout in addition to a primary winding (not shown). The magnetic core member 10 is preferably of ferrite material inasmuch as transformer T1 is intended to operate at a relatively high frequency (e.g., up to 50 kilohertz). The secondary winding N2 has two terminals 12 and 14 at opposite ends thereof. During a half cycle of single phase voltage applied to the transformer T1 the relative voltage polarities at the terminals 12 and 14 are as indicated at FIG. 1. For example, terminal 12 is marked with a plus sign (+) and terminal 14 is marked with a negative sign (−) to indicate that the terminal 12 is positive relative to terminal 14. As is well known, during the next succeeding half cycle of single phase voltage applied to transformer T1, the relative voltage polarities of the aforesaid terminals 12 and 14 on secondary winding N2 reverse.

Four NPN silicon junction transistors Q1, Q2, Q3 and Q4 are provided. Each transistor has an emitter, a base and a collector. Four diodes D1, D2, D3 and D4 are also provided. Each of the diodes has an anode and a cathode. As shown, the anode of diode D1 is electrically connected to the emitter of transistor Q1 and the cathode of the same diode is electrically connected to the collector of transistor Q1. The diodes D2, D3 and D4 are similarly connected to the emitters and collectors of the transistors Q2, Q3 and Q4, respectively.

As indicated at FIG. 1 a single closed magnetic core member 16 has one primary winding P and four secondary windings S1, S2, S3 and S4 wound thereabout. Thus, the aforesaid windings are magnetically coupled on the common magnetic core member 16. Since the rectifier circuit of FIG. 1 handles high frequencies (up to 50 kilohertz) the magnetic core member 16 is of ferrite material. The ends of the various windings on core member 16 have the relative winding polarities indicated at FIG. 1 by the black dots in accordance with convention.

Four resistance elements R1, R2, R3 and R4 are provided. As indicated at FIG. 1 one resistance element and one secondary winding complete a series electrical circuit between the base and emitter of one of the transistors. For example, the resistance element R1 and the secondary winding S1 complete a series electrical circuit between the base and emitter of transistor Q1. Similarly, resistance elements R2, R3 and R4 and the secondary windings S2, S3 and S4, respectively, complete series electrical circuits between the bases and the emitters of the transistors Q2, Q3 and Q4, respectively.

The terminals 12 and 14 of the winding N2 of transformer T1 are connected to one end of the primary winding P and a junction point 18, or node, respectively. The other end of the primary winding P is connected to a junction point 19, or node. The node 18 is a common electrical junction with respect to the emitter of transistor Q3 and the collector of transistor Q2. The node 19 is a common electrical junction with respect to the emitter of transistor Q1 and the collector of transistor Q4.

As shown at FIG. 1 the collectors of transistors Q1 and Q3 are electrically connected to a common output terminal 20, or node. In the arrangement shown at FIG. 1 the output terminal 20 serves as a positive output terminal. Also, the emitters of transistors Q2 and Q4 and the ends of secondary windings S2 and S4 are electrically connected to another output terminal 22, or node. The output terminal 22 serves as a negative output terminal in the arrangement shown at FIG. 1. Electrically connected between the positive and negative output terminals 20 and 22 is the parallel combination of a capacitor C and a resistance element R, one or both of which represent a load for the bridge rectifier circuit of FIG. 1.

Thus, the full-wave bridge rectifier circuit shown at FIG. 1 may be viewed as a four-terminal network having first, second, third and fourth terminals. The fourth terminal being that end of the primary winding P which is electrically connectable to the terminal 12 of winding N2 of power transformer T1; the third terminal being the junction point 18, or node; and, the first and second terminals being the terminals 20 and 22, respectively.

OPERATION OF FULL-WAVE BRIDGE RECTIFIER CIRCUIT OF FIG. 1

Transformer T1 in the bridge rectifier circuit of FIG. 1 may be supplied with a single phase voltage, the waveform of which may be sinusoidal, square, or rectangular. It is often easier, and more economical, to generate non-sinusoidal waveforms. Therefore, it is assumed in the description hereinafter set forth that the voltage between the terminals 12 and 14 of transformer winding N2 is a single-phase, bipolar, rectangular wave voltage. A voltage having such a waveform could, for example, be supplied to the primary winding (not shown) of power transformer T1 from the output terminals of a high frequency inverter circuit like, or similar, to the one disclosed in U.S. patent application Ser. No. 267,262, hereinbefore more completely identified. The frequency of the single-phase, bipolar voltage supplied to transformer T1 is preferably relatively high; e.g., 20 kilohertz, or more. The use of high frequencies is desirable because the volume and weight of the magnetic materials may be considerably reduced. For purposes of discussion it is assumed, initially, that the rectangular wave voltage across the winding N2 is in its first half cycle excursion and going positive so that the terminals 12 and 14 have the instantaneous relative positive and negative voltage polarities indicated at FIG. 1. It is assumed, initially, that all of the transistors are non-conducting; i.e., transistors Q1, Q2, Q3 and Q4 are "off." Therefore, in accordance with conventional current direction respecting the positive voltage polarity of terminal 12 and the negative voltage polarity of terminal 14, a starting, or initial, current between the former and latter terminals is established in the primary winding P, the diode D1, the parallel RC combination between terminals 20 and 22, and the diode D2. The output terminal 20 is at a positive potential relative to the output terminal 22. The diodes D1 and D2 are initially conductive because the voltages at their anodes are more positive than at their cathodes. Even though the diodes D1 and D2 are initially conducting (i.e., "on") the transistors Q1 and Q2 are, initially, non-conducting (i.e., " off"). The transistors Q1 and Q2 remain "off" for a short period while the diodes D1 and D2 are conducting the starting, or initial, current. Because of the relative voltage polarities between their cathodes and anodes the diodes D3 and D4 do not conduct; i.e., they are "off." The collector-base junction of each transistor, Q3 and Q4, blocks essentially the full peak voltage developed between the output terminals 20 and 22; the collector-base junction being, normally, the higher voltage junction of the transistor.

The current in diodes D1 and D2 is also in the primary winding P. Due to current transformer action, occasioned by the magnetic coupling between the primary winding P and the secondary windings S1 and S2, proportional currents appear in the secondary windings S1 and S2. As a consequence, there are initiated currents into the bases of transistors Q1 and Q2 through the resistance elements R1 and R2, respectively. These base currents eventually cause transistors Q1 and Q2 to become turned "on" (i.e., become conducting) whereupon a low impedance path is provided between the terminals 12 and 14. The aforesaid low impedance path includes the following elements in series between terminals 12 and 14; the primary winding P; the emitter-collector of transistors Q1; the parallel RC combination of elements between terminals 20 and 22; and, the emitter-collector of transistor Q2.

As stated hereinbefore, transistors Q1 and Q2 are not turned "on" at the same instant of time that the diodes D1 and D2 begin conducting. There is a short time delay before transistors Q1 and Q2 become turned "on." The use of the diodes D1 and D2 permits the rapid initiation of base current in the transistors Q1 and Q2, respectively, thereby turning transistors Q1 and Q2 "on," rapidly. The aforementioned short time delay period, occurring between the turning "on" of diodes D1 and D2 and the turning "on" of the transistors Q1 and Q2, with which said diodes are associated, is considerably shortened because as soon as diodes D1 and D2 begin conducting the secondary windings S1 and S2 inject current into the bases of transistors Q1 and Q2, through resistance elements R1 and R2, so as to cause the rapid turning "on" of these transistors. When transistor Q1 is turned "on" and is conducting it shunts the diode D1 and, in effect, the voltage drop across the diode D1 is considerably lowered. Similarly, when transistor Q2 is turned "on" and is conducting it shunts the diode D2 and, in effect, the voltage drop across the diode D2 is also considerably lowered. Eventually, the current in diodes D1 and D2 goes to zero due to the shunting action of transistors Q1 and Q2, respectively.

The function of the resistance elements R1 and R2 (as well as R3 and R4) is discussed in detail hereinafter.

The primary winding P and the secondary windings S1 and S2, magnetically coupled with the primary winding P, perform the important function of controlling, or regulating, the magnitude of the base currents of transistors Q1 and Q2. The base current magnitudes are controlled such that they are proportional to the emitter current magnitudes. Since the emitter current of transistor Q1 is in the primary winding P the magnetic coupling between the windings P and S1 enables the secondary winding S1 to develop a current of proper magnitude and polarity, in response to the emitter current in the primary winding P; i.e., to cause a base current of near optimum magnitude in transistor Q1. Similarly, the magnetic coupling between the windings P and S2 enables the secondary winding S2 to develop a current of proper magnitude and polarity, in response to the current in the primary winding P; i.e., to cause a base current in transistor Q2 of near optimum magnitude. Since the primary winding P is magnetically coupled with the two secondary windings S1 and S2 which are, in turn, loaded by R1–Q1 and R2–Q2, respectively, the primary winding P, in effect, drives two parallel circuits. Therefore, the resistance elements R1 and R2, coupled with the windings S1 and S2, respectively, insure current sharing, or equalization, between the secondary circuits in which they are located; i.e., the circuitry connected to the windings S1 and S2, respectively, carry substantially equal currents.

Equalization of the currents in the circuits driven by the secondary windings S1 and S2 is required in order to turn "on" the transistors Q1 and Q2 substantially simultaneously. In implementing the circuit shown at FIG. 1 with discrete components the transistors Q1 and Q2 (as well as transistors Q3 and Q4) are preferably selected to be matched transistors. However, even though matched transistors are employed there will inevitably be some differences between the transistors. Thus, the resistance elements R1. . .R4 are selected so as to compensate for the differences. In the event that the circuitry of FIG. 1 is largely fabricated as an integrated circuit on, for example, a single silicon chip the characteristics of the transistors would tend to be nearly identical. In such case the ohmic values of the resistance elements R1. . .R4 may be relatively small and circuit losses may be kept to a minimum.

The resistance elements R1. . .R4 contribute:

1. to optimizing transistor base currents; and,
2. insuring substantially simultaneous turn "on," as well as turn "off," of transistors Q1–Q2 and Q3–Q4.

The magnitudes of the base currents in transistors Q1 and Q2 are proportional to the magnitudes of the emitter currents of these transistors; the emitter currents of transistors Q1 and Q2 being equalized by the resistance elements R1 and R2, respectively, as hereinbefore discussed. If transistor base current is of greater magnitude than that which is required for sustaining conduction in the transistor, the excess base current causes losses, the magnitude of which may be significant. Hence in optimizing the base currents the ideal situation to be achieved would be to provide base current of a magnitude which is sufficient to minimize the voltage drop between the terminals 12 and 20 as well as between the terminals 22 and 14. Therefore, the set of windings P-S1, associated with transistor Q1, and the set of windings P-S2, associated with transistor Q2, function as aforesaid so that the aforementioned ideal situation may be closely approached. As a result, high efficiency is maintained at all levels of load current since the base currents are proportional to the emitter currents and are never significantly in excess of that which is required. As long as the transformer terminal 12 is positive both transistors Q1 and Q2 are "on," and the current is out of the collector of transistor Q1, through the parallel RC combination between the terminals 20 and 22, into the emitter of transistor Q2 and out of the collector of transistor Q2. The charge on the capacitor C increases (becomes more positive at terminal 20) due to the collector current out of transistor Q1. Hence the voltage at terminal 20 approaches the peak voltage available at the transformer output terminal 12. More particularly, the output terminal 20 (and the upper plate of capacitor C) is charged to a positive potential, the magnitude of which is the peak positive voltage of the positive rectangular wave voltage occurring at the terminal 12 during each positive half cycle of the rectangular wave voltage across the winding N2 of transformer T1. Because of the parallel connection between the resistance element R and the capacitor C, the resistance element R has the same voltage across it as is across the capacitor C. At the end of the positive half cycle, the positive voltage at terminal 12 begins to diminish in magnitude, or amplitude, as it starts to fall toward zero voltage. At some point during its fall toward zero voltage, the diminishing positive voltage at the terminal 12 becomes less positive than the positive voltage at the output terminal 20. Consequently, current reverses its direction and is now from terminal 20, into the collector of transistor Q1, out of the emitter of transistor Q1 and into the primary winding P. Similarly, terminal 14 of transformer T1 is more positive than the output terminal 22 so that current is from terminal 14, into the junction point 18 and the collector of transistor Q2, out of the emitter of transistor Q2 and into the output terminal 22. Since the current in the primary winding P is now in a reverse direction, the relative voltage polarities on the secondary windings S1 and S2 are reversed so that base current is out of the transistors Q1 and Q2. These base currents are in such directions as to hasten the turn "off" of transistors Q1 and Q2. Thus, for the transistors Q1 and Q2 the collector, emitter and base currents are reversed until the stored charges in these transistors are depleted. The aforesaid reverse currents in transistors Q1 and Q2 may continue even when the voltage at terminal 12 becomes zero.

During the time that transistors Q1 and Q2 are conducting current in the aforesaid reverse directions, the terminal 14 of power transformer T1 is becoming more positive relative to terminal 12. During the short period of reverse conduction in transistors Q1 and Q2 the positive potential at the output terminal 20 is diminishing in magnitude due to the discharge of capacitor C into the collector of transistor Q1. When the increasing positive potential at terminal 14 exceeds the decreasing positive potential at terminal 20 the diodes D3 and D4 turn "on." More particularly, diode D3 turns "on" because terminal 14 (and junction point 18) as well as the anode of diode D3 are more positive than the cathode of diode D3 and the output terminal 20. Diode D4 turns "on" because the anode of diode D4 and terminal 22 are more positive than the cathode of diode D4 and junction point 19, as well as terminal 12. Accordingly, there exists a condition wherein diodes D3 and D4 are forward conducting and transistors Q1 and Q2 are conducting reverse currents, as hereinbefore described. Hence, for a short interval of time current is out of the cathode of diode D3 and into the collector of transistor Q1. Also, current is out of the emitter of transistor Q2 and into the anode of diode D4. Eventually, transistors Q1 and Q2 turn "off" because of the actions, hereinbefore set forth, of the secondary windings S1 and S2 in driving the base current out of the transistors Q1 and Q2.

Shortly after the diodes D3 and D4 turn "on" the transistors Q3 and Q4, associated therewith, turn "on." Transistors Q3 and Q4 turn "on" when base current is supplied to these transistors from the secondary windings S3 and S4, respectively. More particularly, current out of diode D4 and into the primary winding P causes the secondary windings S3 and S4, magnetically coupled to the primary winding P, to develop currents through the resistance elements R3 and R4 into the bases of transistors Q3 and Q4 to turn these transistors "on." When transistors Q3 and Q4 turn "on" the current in diodes D3 and D4 goes to zero due to the shunting action of the transistors Q3 and Q4. Thus, transistors Q3 and Q4 and diodes D3 and D4 function according to a sequence of events similar to those hereinbefore described with reference to the functioning of transistors Q1 and Q2 and the diodes D1 and D2.

It is possible that for a very short period of time all transistors Q1, Q2, Q3 and Q4 may be "on" due, primarily, to stored charges in those transistors (Q1 and Q2, for example) which are about to turn "off." In the aforesaid case where all transistors Q1. . .Q4 are "on" and conducting, simultaneously, the collector, base and emitter current directions are as follows: current is into the collectors of transistors Q1 and Q2; current is out of the emitters of transistors Q1 and Q2; current is into the emitters of transistors Q3 and Q4; current is out of the collectors of transistors Q3 and Q4; current is out of the bases of transistors Q1 and Q2; and, current is into the bases of transistors Q3 and Q4. Since current is out of the bases of transistors Q1 and Q2 these transistors rapidly turn "off." Turn "off" of the transistors Q1 and Q2 is hastened by the polarity reversals of the windings S1 and S2. The reversal of current in the primary winding P induces secondary windings S1 and S2 to reverse the base currents in transistors Q1 and Q2, respectively. Advantageously, the combination of windings P-S1 and P-S2 hasten the turn "off" of transistors Q1 and Q2 and switching losses in these transistors are minimized.

With the terminal 14 of transformer winding N2 at a positive potential relative to terminal 12 transistors Q3 and Q4 continue conducting so that current is from terminal 14 to junction point 18, into the emitter of transistor Q3, out of the collector of transistor Q3 to the terminal 20, through the parallel RC combination to output terminal 22, into the emitter of transistor Q4, out of the collector of transistor Q4 to junction point 19, through primary winding P and to terminal 12. Also, while transistors Q3 and Q4 are conducting, current is through resistance element R3 and into the base of transistor Q3; and, current is through resistance element R4 and into the base of transistor Q4. As was the case when transistors Q1 and Q2 began to conduct initially (during the first half cycle of the voltage between terminals 12 and 14 when terminal 12 was becoming increasingly more positive) the collector and emitter current directions for the transistors Q3 and Q4 are such that current is into the emitters and out of the collectors of these transistors.

These current directions are the reverse of what they would ordinarily be. Accordingly, the transistors Q3 and Q4 (as well as transistors Q1 and Q2) are effectively connected in an inverted mode in the full bridge configuration shown at FIG. 1. More particularly, transistors Q1 and Q2 are in inverted mode conduction during the first half cycle of the rectangular voltage across the winding N2; and, transistors Q3 and Q4 are in inverted mode conduction during the second half cycle of the rectangular wave voltage across the winding N2.

The relative polarities of the windings S1 and S2 as well as S3 and S4 are such that the forward base-emitter voltage on the conducting two of the four transistors is impressed as a reverse base-emitter voltage on the blocking, or non-conducting, transistors thereby assuring reliable voltage blocking.

As indicated hereinbefore, one feature of the invention relates to the way in which all of the transistors are connected in the full-wave bridge circuit shown at FIG. 1. All of the transistors are connected in an inverted, or reverse, mode. In FIG. 1 the symbols identified as Q1, Q2, Q3 and Q4 represent NPN transistors. In the exemplary rectifier circuit of FIG. 1 the transistors are NPN silicon junction transistors. Each transistor has an emitter, a base and a collector which are represented in the conventional way. The NPN transistor is normally employed in switching circuits in such a way that current is into its collector toward the collector-base junction and out of its emitter, away from the base-emitter junction. However, when transistors Q1 and Q2 are turned "on," during the first half cycle of voltage and are conducting, their emitter currents are into the transistors toward the base-emitter junctions and their collector currents are out of the transistors and away from the collector-base junctions. The same is true for the emitter and collector currents of transistors Q3 and Q4 during the second, or succeeding, half cycle of voltage. Thus, in FIG. 1 (and in FIGS. 2 and 3, as well) the conventional transistor symbols are employed and the emitter, collector and base leads are identifiable as in the particular manufacturer's device. However, in FIG. 1 (as well as in FIGS. 2 and 3) the current directions as hereinbefore described, are the reverse of the normal current directions. The advantages of using transistors in the aforesaid inverted mode connection are as follows: losses are minimized due to the low transistor saturation voltage thereby enabling high efficiency rectification operation; and, voltage blocking is performable by the collector-base junction rather than the emitter-base junction so that low cost, readily available silicon transistors normally having a relatively low $BV_{EBO}$ may be used.

The parameters (e.g., $BV_{EBO}$) respecting various transistor characteristics are known to those skilled in transistor technology. For a detailed meaning of the various parameters see the publication *G.E. Transistor Manual*, Revised 7th Edition, Edited and Produced by Semiconductor Products Department, General Electric Company, Electronics Park, Syracuse, N.Y.

Figure 2:
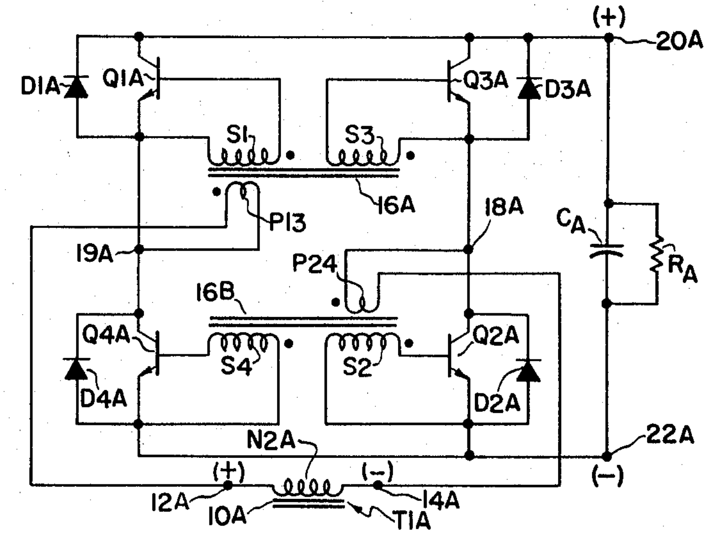
FIG. 2 is another schematic diagram showing another full-wave bridge rectifier circuit in accordance with another exemplary embodiment of the invention.

Another single-phase, full-wave bridge rectifier circuit, embodying the invention, is illustrated in schematic form at FIG. 2. Many of the circuit elements employed in the bridge circuit of FIG. 2 are like those employed in FIG. 1. Hence, like elements are similarly identified. Elements of the FIG. 2 rectifier circuit which are comparable to like elements of the FIG. 1 rectifier circuit are identified with reference characters including the additional letter A. For example, comparable transistors in the FIG. 1 and FIG. 2 circuits are identified as Q1 and Q1A, respectively.

The full-wave bridge rectifier circuit of FIG. 2 differs from that of FIG. 1 in that two separate magnetic core members 16A and 16B and sets of windings P13-S1-S3 and P24-S2-S4, respectively, are employed, rather than the single core member 16 and sets of windings P-S1. . .S4 of FIG. 1. In the circuit of FIG. 2 resistance elements (such as the resistance elements R1. . .R4 of FIG. 1) are not required because of the use of separate core members 16A and 16B and the separate primary windings (indicated in FIG. 2) associated with these separate core members. The full-wave bridge rectifier circuit of FIG. 2 functions in the same way as the rectifier circuit shown at FIG. 1. Briefly, the diodes D1A and D2A conduct initial, or starting, current. This starting current is also in the primary winding P13 and P24. The secondary windings S1 and S2 develop base currents which are into the bases of transistors Q1A and Q2A, respectively. Thus, transistors Q1A and Q2A turn "on." Subsequently, the current in diodes D1A and D2A goes to zero due to the shunting action of the transistors Q1A and Q2A, respectively. With the transistors Q1A and Q2A turned "on" current is out of terminal 12A, through winding P13 to junction point 19A, into the emitter of transistor Q1A, out of the collector of transistor Q1A and to output terminal 20A, through the parallel combination of resistance element $R_A$ and capacitor $C_A$ to output terminal 22A, into the emitter of transistor Q2A, out of the collector of transistor Q2A and to junction point 18A, through the primary winding P24 and to the terminal 14A. Thus, both transistors Q1A and Q2A are in inverted mode conduction while the transistors Q3A and Q4A are "off." Subsequently, when the voltage at output terminal 20A becomes more positive than the voltage at terminal 12A current is from terminal 20A into the collector of transistor Q1A, out of the emitter of transistor Q1A and into the junction point 19A, through the primary winding P13 and to the terminal 12A, out of winding 14A and through primary winding P24 to the junction point 18A, into the collector of transistor Q2A, out of the emitter of transistor Q2A and to the output terminal 22A. After a short time, transistors Q1A and Q2A turn "off." When terminal 14A is positive relative to terminal 12A the initial, or starting, current is through primary winding P24, through diode D3A, through the parallel $R_AC_A$ combination between terminals 20A and 22A, through diode D4A to junction point 19A and through primary winding P13 to terminal 12A. The secondary windings S3 and S4 eventually develop sufficient base current into the bases of transistors Q3A and Q4A to turn these transistors "on." As was the case with the bridge circuit of FIG. 1, it is possible that for a very short period of time all of the transistors Q1A. . .Q4A may be "on" due, primarily, to stored charges in those transistors which are about to turn "off." Turn "off" of the pairs of transistors Q1–Q2, or Q3–Q4, is hastened by the polarity reversal of the windings S1–S2, or S3–S4. Such polarity reversals are caused by reverse current in the primary winding P13 or P24. Advantageously, transistor turn "off" is hastened by the action of the magnetically coupled windings so that switching losses in the transistors are minimized.

Figure 3:
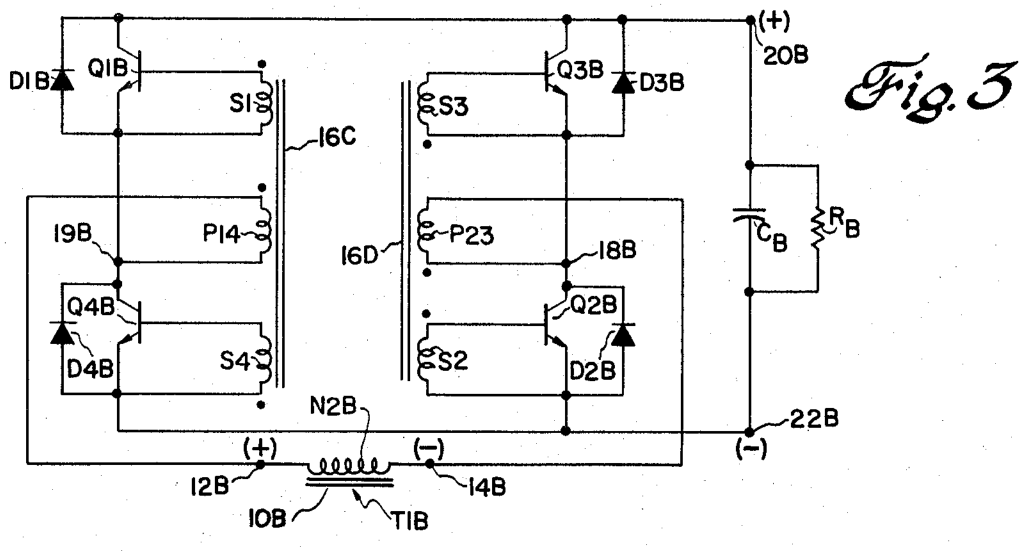
FIG. 3 is another schematic diagram of another full-wave bridge rectifier circuit in accordance with another exemplary embodiment of the invention.

Another single-phase, full-wave bridge rectifier circuit, embodying the invention, is illustrated in schematic form at FIG. 3. Many circuit elements employed in the bridge circuit of FIG. 3 are like those employed in the circuit of FIG. 2. Hence, like elements are similarly identified. Elements of the FIG. 3 rectifier circuit which are comparable to like elements of the FIG. 2 rectifier circuit are identified with reference characters including the letter B. For example, comparable transistors in FIGS. 2 and 3 are identified as Q1A and Q1B, respectively. The full-wave bridge rectifier circuit of FIG. 3 differs from that of FIG. 2 in the way in which various sets of magnetically coupled windings are combined. For example, in FIG. 3 a separate magnetic core member 16C has a primary winding P14, a secondary winding S1 and another secondary winding S4 wound thereabout. Similarly, in FIG. 3 a primary winding P23 and two secondary windings S2 and S3 are wound on another separate magnetic core member 16D. Thus, in FIG. 3 the secondary windings S1 and S4 associated with transistors Q1B and Q4B share a common core with the primary winding P14 whereas in FIG. 2 two secondary windings S1 and S3 share a common magnetic core 16A with a primary winding P13; the secondary windings S1 and S3 being associated with transistors Q1A and Q3A. Similarly, in FIG. 3 the secondary windings S2 and S3 which share the magnetic core member 16D with primary winding P23 are associated with transistors Q3B and Q2B whereas in FIG. 2 the windings S2 and S4 which control transistors Q2A and Q4A are magnetically coupled on a separate core member 16B together with a primary winding P24. The full-wave bridge rectifier circuit shown at FIG. 3 functions in substantially the same way as the rectifier circuit shown at FIG. 2.

In the bridge rectifier circuits illustrated at FIGS. 1, 2 and 3 the transistors employed may be PNP transistors instead of the NPN transistors shown. The PNP transistors would, in accordance with the principles hereinbefore described, be connected in an inverted mode.

Although the foregoing description and accompanying drawing figures set forth three single-phase full-wave bridge rectifier circuits embodying the invention, it is to be understood that the foregoing description and drawing figures are purposeful for providing examples of the invention. Many changes may be made respecting the elements, and combination of elements, of the disclosed rectifier circuit. Such changes may involve, inter alia, substitutions, modifications, rearrangements, etc. of the various elements or devices. Nevertheless, such changes may be made without departing from the spirit of the invention, or from the scope of the claims hereinafter set forth.

What is claimed is:

1. A full-wave bridge rectifier circuit, suitable for being electrically connected between an a.c. source across which an alternating voltage exists and load across which a unipolar voltage is establishable by the rectifier circuit, comprising: four transistors, each including an emitter, a base, a collector and a collector-base junction, said four transistors being electrically connected in a bridge circuit configuration such that one pair of transistors have their collectors electrically connected and define a first terminal of the rectifier circuit and the other pair of transistors have their emitters electrically connected and define a second terminal of the rectifier circuit, the emitters of the one pair of transistors being electrically connected to the collectors, respectively, of the other pair of transistors, the electrically connected emitter and collector of a first transistor of the one pair of transistors and of a first transistor of the other pair of transistors, respectively, defining a third terminal of the rectifier circuit; a primary winding including one end, defining a fourth terminal of the rectifier circuit, and another end electrically connected to the emitter and collector, respectively, of a second transistor of the one pair of transistors and a second transistor of the other pair of transistors; and, four secondary windings magnetically coupled with said primary winding, each transistor having a different one of the secondary windings electrically connected between the emitter and base thereof, said secondary windings having winding polarities such that the bases of the one pair of transistors having opposite polarities established thereat and the bases of the other pair of transistors have opposite polarities established thereat, and such that the base of said first transistor of said one pair of transistors has an opposite winding polarity to the base of the first transistor of said other pair of transistors; the load being electrically connectable between said first and second terminals of the rectifier circuit and the a.c. source being electrically connectable between said third and fourth terminals of the rectifier circuit so that voltage blocking is performable by the collector-base junctions of the transistors.

2. The bridge rectifier circuit as set forth in claim 1 further comprising four resistance elements, a different one of said resistance elements being electrically connected in series with a different one of said secondary windings and forming four series circuits, each series circuit being electrically connected between the emitter and base of a different one of said transistors, said series circuits including said resistance elements controlling the base currents of said transistors so that those transistors having the same secondary winding polarities are caused to have substantially equal base currents during their conduction periods and substantially simultaneous initiation of turn "on" and turn "off."

3. The bridge rectifier circuit as set forth in claim 1 wherein said transistors are NPN transistors.

4. The bridge rectifier circuit as set forth in claim 1 wherein said transistors are NPN silicon junction transistors.

5. The bridge rectifier circuit as set forth in claim 1 wherein said transistors are PNP transistors.

6. The bridge rectifier circuit as set forth in claim 1 wherein said transistors are PNP silicon junction transistors.

7. The bridge rectifier circuit as set forth in claim 3 further comprising four diodes, each including an anode and a cathode, each transistor having a different diode electrically connected therewith such that the anode and cathode of the diode are electrically connected between the emitter and collector, respectively, of the transistor.

8. The bridge rectifier circuit as set forth in claim 5 further comprising four diodes, each having an anode and a cathode, each transistor having a different diode electrically connected therewith such that the anode and cathode of the diode are electrically connected between the collector and emitter, respectively, of the transistor.

9. The bridge rectifier circuit as set forth in claim 1 further comprising a capacitor electrically connected between said first and second terminals of the rectifier circuit.

10. The bridge rectifier circuit as set forth in claim 1 further comprising one magnetic core member having said primary and secondary windings wound thereon.

11. The bridge rectifier circuit as set forth in claim 1 wherein said rectifier circuit is further comprised of four resistance elements, a different one of said resistance elements being electrically connected in series with a different one of said secondary windings and forming four series circuits, each series circuit being electrically connected between the emitter and base of a different one of said transistors, said series circuit including said resistance elements controlling the base currents of said transistors so that those transistors having the same secondary winding polarities are caused to have substantially equal base currents during their conduction periods and substantially simultaneous initiation of turn "on" and turn "off", and wherein said rectifier circuit is further comprised of four diode means, each transistor having a different diode means electrically connected therewith between the emitter and collector thereof, and wherein said rectifier circuit is further comprised of a capacitor electrically connected between said first and second terminals of the rectifier circuit.

12. A full-wave bridge rectifier circuit, suitable for being electrically connected between an a.c. source across which an alternating voltage exists and a load across which a unipolar voltage is establishable by the rectifier circuit, comprising: four transistors, each including an emitter, a base, a collector and a collector-base junction, said four transistors being electrically connected in a bridge circuit configuration such that one pair of transistors have their collectors electrically connected and define a first terminal of the rectifier circuit and the other pair of transistors have their emitters electrically connected and define a second terminal of the rectifier circuit, the emitters of the one pair of transistors being electrically connected to the collectors, respectively, of the other pair of transistors; a pair of primary windings, each including one and other ends, one end of one primary winding defining a third terminal of the rectifier circuit and one end of the other primary winding defining a fourth terminal of the rectifier circuit, the other end of the one primary winding being electrically connected to the emitter and collector, respectively, of a second transistor of the one pair of transistors and a second transistor of the other pair of transistors, the other end of the other primary winding being electrically connected to the emitter and collector, respectively, of a first transistor of the one pair of transistors and a first transistor of the other pair of transistors; and, two pairs of secondary windings, one pair of secondary windings being magnetically coupled with one of the primary windings and the other pair of secondary windings being magnetically coupled with the other primary winding, each transistor having a different one of the secondary windings electrically connected between the emitter and base thereof, said secondary windings having winding polarities such that the bases of the one pair of transistors have opposite polarities established thereat and the bases of the other pair of transistors have opposite polarities established thereat; the load being electrically connectable between said first and second terminals of the rectifier circuit and the a.c. source being electrically connectable between said third and fourth terminals of the rectifier circuit so that voltage blocking is performable by the collector-base junctions of the transistors.

13. The bridge rectifier circuit as set forth in claim 12 further comprising two magnetic core members, one magnetic core member having one of the primary windings and one pair of the secondary windings wound thereon, the other magnetic core member having the other primary winding and the other pair of secondary windings wound thereon.

14. The bridge rectifier circuit as set forth in claim 12 wherein said transistors are NPN transistors.

15. The bridge rectifier circuit as set forth in claim 12 wherein said transistors are NPN silicon junction transistors.

16. The bridge rectifier circuit as set forth in claim 12 wherein said transistors are PNP transistors.

17. The bridge rectifier circuit as set forth in claim 12 wherein said transistors are PNP silicon junction transistors.

18. The bridge rectifier circuit as set forth in claim 12 further comprising four diode means, each transistor having a different one of the diode means electrically connected therewith between the emitter and collector thereof.

19. The bridge rectifier circuit as set forth in claim 12 further comprising a capacitor electrically connected between the first and second terminals of the rectifier circuit.

20. The bridge rectifier circuit as set forth in claim 13 further comprising four diode means, each transistor having a different one of the diode means electrically connected therewith between the emitter and collector thereof, and further comprising a capacitor electrically connected between the first and second terminals of the rectifier circuit.

21. A full-wave bridge rectifier circuit, suitable for being electrically connected between an a.c. source across which an alternating voltage exists and a load across which a unipolar voltage is establishable by the rectifier circuit, comprising: four transistors, each including an emitter, a base, a collector and a collector-base junction, said four transistors being electrically connected in a bridge circuit configuration such that one pair of transistors have their collectors electrically connected and define a first terminal of the rectifier circuit and the other pair of transistors have their emitters electrically connected and define a second terminal of the rectifier circuit, the emitters of the one pair of transistors being electrically connected to the collectors, respectively, of the other pair of transistors; four secondary windings, each transistor having a different one of the secondary windings electrically connected between the emitter and base thereof, said secondary windings having winding polarities such that the bases of the one pair of transistors have opposite polarities established thereat and the bases of the other pair of transistors have opposite polarities established thereat, and such that the base of said first transistor of one pair of transistors has an opposite winding polarity to the base of the first transistor of said other pair of transistors; and, primary winding means adapted for being electrically connected in a series electrical circuit with the a.c. source, said series electrical circuit having terminations at opposite ends thereof defining third and fourth terminals, respectively, of the rectifier circuit, said third terminal of the rectifier circuit being electrically connected to the emitter and collector of a first transistor of the one pair of transistors and a first transistor of the other pair of transistors, respectively, said fourth terminal of the rectifier circuit being electrically connected to the emitter and collector of a second transistor of the one pair of transistors and a second transistor of the other pair of transistors; the load being electrically connectable between said first and second terminals of the rectifier circuit and the a.c. source being electrically connected in said series electrical circuit between the third and fourth terminals of the rectifier circuit so that voltage blocking is performable by the collector-base junctions of the transistors.

22. The bridge rectifier circuit as set forth in claim 21 further comprising four diode means, each transistor having a ddifferent one of the diode means electrically connected therewith between the emitter and collector thereof.

23. The bridge rectifier circuit as set forth in claim 21 further comprising a capacitor electrically connected between said first and second terminals of the rectifier circuit.

24. The bridge rectifier circuit as set forth in claim 21 wherein said primary winding means and said four secondary windings are magnetically coupled on one magnetic core member.

25. The bridge rectifier circuit according to claim 21 further comprising first and second magnetic core members, two of said four secondary windings being magnetically coupled on said first magnetic core member together with part of said primary winding means and the other two secondary windings being magnetically coupled on said second magnetic core member together with the remainder of said primary winding means.

* * * * *

(5/69)

UNITED STATES PATENT OFFICE

CERTIFICATE OF CORRECTION

Patent No. 3,851,240 Dated November 26, 1974

Inventor(s) John N. Park, Robert L. Steigerwald, Loren H. Walker

It is certified that error appears in the above-identified patent and that said Letters Patent are hereby corrected as shown below:

In the title: --INVERTER-- should read "INVERTED"

Signed and sealed this 4th day of March 1975.

(SEAL)
Attest:

RUTH C. MASON
Attesting Officer

C. MARSHALL DANN
Commissioner of Patents
and Trademarks